United States Patent [19]

Parsons et al.

[11] Patent Number: 4,776,212
[45] Date of Patent: Oct. 11, 1988

[54] POCKET SURFACE ROUGHNESS GAGE

[75] Inventors: Frederick G. Parsons, Cranston; Mark H. Miller, Johnston, both of R.I.; Eugene F. Cote, Somerset, Mass.

[73] Assignee: Federal Products Corporation, Providence, R.I.

[21] Appl. No.: 63,667

[22] Filed: Jun. 19, 1987

[51] Int. Cl.[4] .............................................. G01B 5/28
[52] U.S. Cl. ........................................................ 73/105
[58] Field of Search ........................................... 73/105

[56] References Cited

U.S. PATENT DOCUMENTS

| | | | |
|---|---|---|---|
| 2,404,143 | 7/1946 | Reason | 73/105 |
| 2,460,726 | 2/1949 | Arndt, Jr. | 73/105 |
| 2,620,655 | 12/1952 | Priest | 73/105 |
| 3,049,002 | 8/1962 | Hediger | 73/105 |
| 4,106,333 | 8/1978 | Saljé et al. | 73/105 |
| 4,133,204 | 1/1979 | Mittleman | 73/105 |
| 4,359,892 | 11/1982 | Schnell et al. | 73/105 |
| 4,574,625 | 3/1986 | Olasz et al. | 73/105 |
| 4,665,739 | 5/1987 | Mizuno | 73/105 |

FOREIGN PATENT DOCUMENTS

| | | | |
|---|---|---|---|
| 1250135 | 9/1967 | Fed. Rep. of Germany | 73/105 |
| 630848 | 10/1949 | United Kingdom | 73/105 |

Primary Examiner—John Chapman
Assistant Examiner—Robert R. Raevis
Attorney, Agent, or Firm—Nutter, McClennen & Fish

[57] ABSTRACT

A compact, efficient, self-contained dynamic surface roughness gage includes a staging frame that supports a reciprocatable arm that can be pivoted about an axis perpendicular to a V-shaped working surface at the underside of the frame between releasably fixed positions located 90° apart to facilitate staging the gage on different workpiece configurations. The arm supports a probe comprising a skid and a stylus which is coupled by way of a special flexure to a stereo phonograph cartridge so that only the vibratory motions of the stylus in a direction perpendicular to the nominal plane of the frame working surface are coupled to the transducer. As the probe scans over a workpiece surface with the skid following the same track as the stylus, the two outputs from the transducer are summed to produce a single electrical analog of the vibratory motion of the stylus in that favored direction. That signal is coupled to a control circuit which processes the signal and applies an instruction to a display which thereupon shows a number correspnding to the surface roughness of the workpiece as measured by the gage.

23 Claims, 5 Drawing Sheets

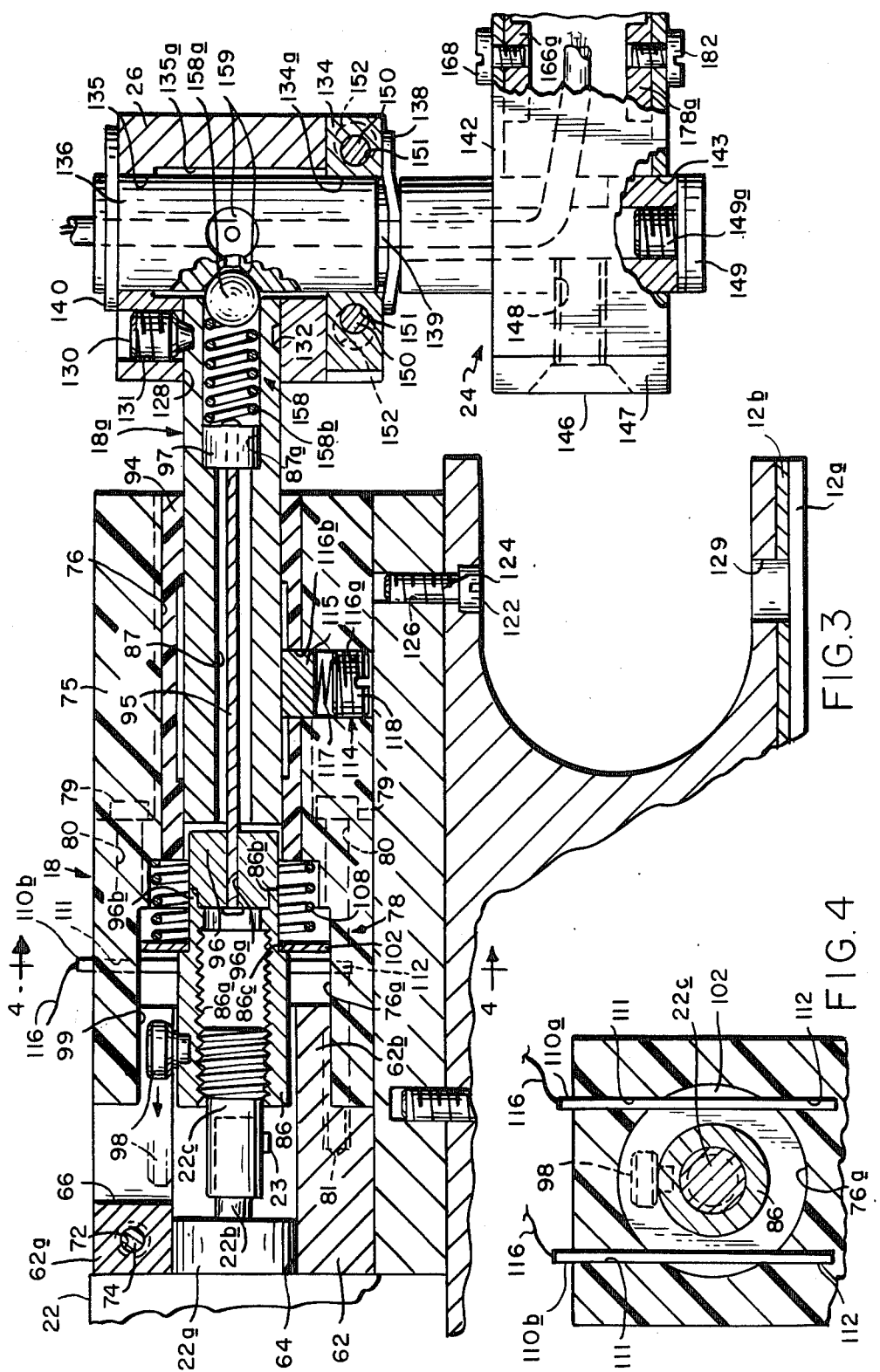

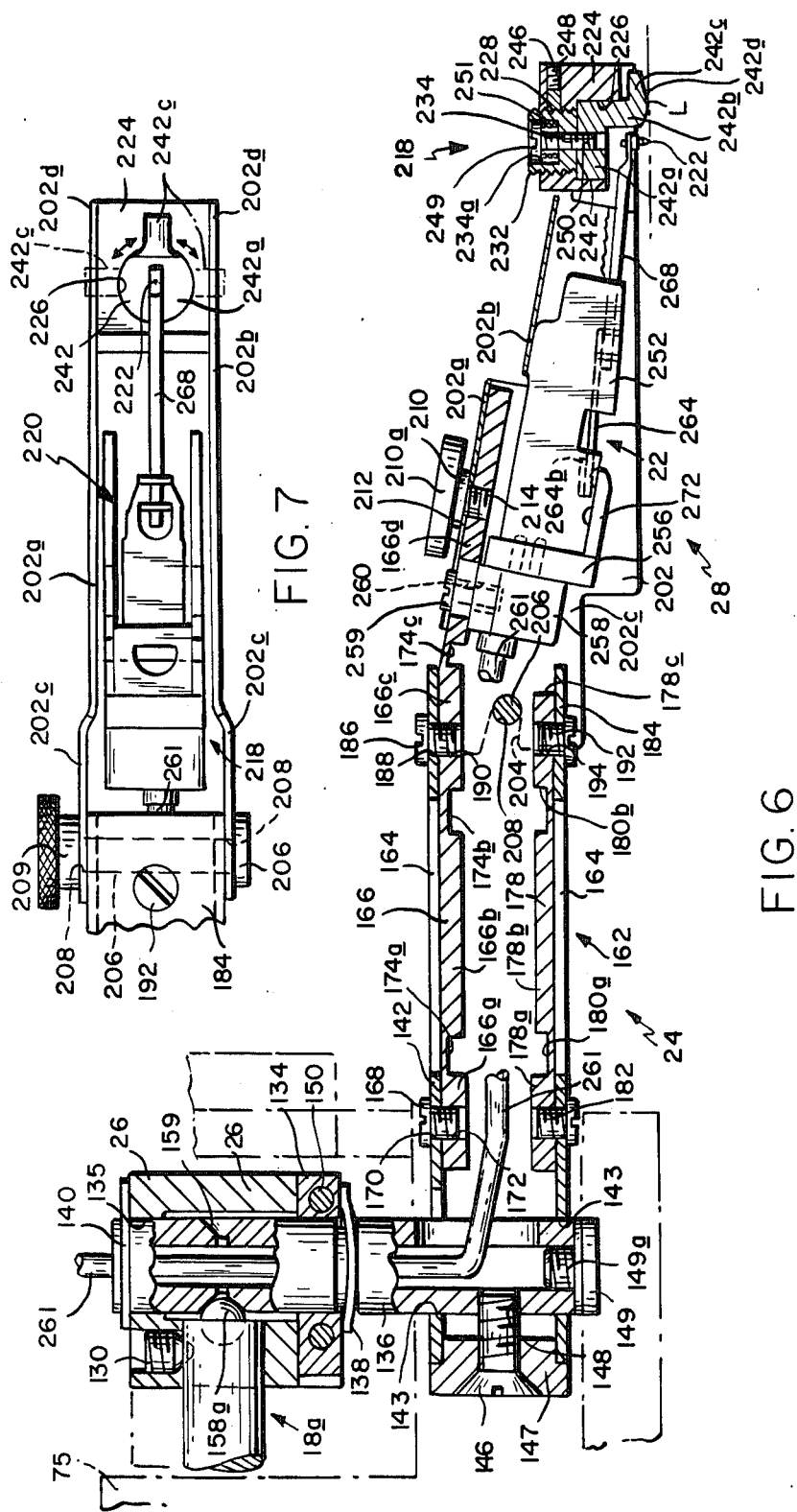

POCKET SURFACE ROUGHNESS GAGE

This invention relates to a measuring instrument. It relates, more particularly, to an instrument or gage for measuring the surface roughness or finish of a workpiece or part.

BACKGROUND OF THE INVENTION

The surface irregularities of a workpiece or part may be divided into three categories, namely: formness, waviness, and roughness. Formness is the general shape or outline of the workpiece, waviness is a measure of gradual variations in a workpiece surface such as undulation, camber and the like, while roughness is a measure of very small surface irregularities, typically less than 0.030 inch. As parts tolerances have become tighter over the years, the importance of surface roughness to the functionality of a physical surface has been well recognized. It is known, for example, that roughness affects such surface characteristics as coefficient of friction, nature and degree of wear, appearance, reflectivity, adherence of coatings and lubricant retention, to name a few. As a result, there exist a number of commercially available instruments for the measurement and assessment of surface roughness.

One common type of such instrument is the dynamic gage. The gage, which includes a frame and a movable stylus, is adapted to rest on the surface to be examined, with the stylus maintained in contact with the surface. The stylus is moved by a drive motor along a line on the workpiece surface and it follows the surface irregularities along that line. The vertical movements or vibrations of the stylus are detected and a corresponding electrical analog is developed whose amplitude represents the surface roughness along that line of the workpiece. That output signal is then averaged and used to provide a visual indication of the roughness characteristic. Usually a skid is mounted adjacent to the stylus and rides along the surface being examined to filter out the more gradual variations in the workpiece topography that contribute to its waviness. Thus, by proper selection of the skid contact area and suitable output signal filtering, one can select a particular roughness range or window to suit the particular application. In other words, low wave variations in the surface topography which do not contribute to surface roughness and very high frequency surface irregularities which are too small to be of interest may be eliminated from the measurement. Conventional surface roughness measuring instruments of this type are disclosed, for example, in U.S. Pat. Nos. 2,733,598 and 4,106,333.

Prior gages of this kind are disadvantaged for several reasons. Some are overly large and awkward to use; some are quite complex and expensive, costing two thousand dollars or more. Those instruments that are relatively compact still cannot be positioned to measure roughness at certain rounded or irregular workpiece surface, at least not without special staging fixtures. These separate fixtures can be misplaced easily and the interface between the fixture and the gage provides a potential source of measurement error. Furthermore, the fixtures which adapt the prior gages to measure rounded surfaces space the gage at different distances from the workpiece surface depending on the curvature of that surface, thereby introducing locational variations in the roughness measurements of those different surfaces. In still other conventional surface roughness gages, the gage profile, size or shape make it difficult, if not impossible, to take measurements of some relatively inaccessable surfaces.

Another problem arises with these instruments because the output signal frequency of each gage is determined by the speed of the measurement, i.e. the speed across the workpiece surface of a motor-driven stylus. Therefore, the measurement must be taken at constant speed. In some prior gages, the surface roughness data is taken based on fixed clock or recorder pulses so that motor speed variations affect the repeatability of the measured data.

SUMMARY OF THE INVENTION

Accordingly, it is an object of the present invention to provide an improved surface roughness gage.

Another object of the invention is to provide a surface roughness gage which is lightweight and compact enough to fit easily into the user's hand or pocket so that it is always available when needed.

Another object of the invention is to provide a pocket surface roughness gage which is completely portable and self-contained.

A further object of the invention is to provide a gage of this type which is relatively inexpensive to manufacture.

Yet another object of the invention is to provide a pocket surface roughness gage which is highly efficient and easy to use.

Yet another object of the invention is to provide such a gage which requires no ancillary fixtures to stage the gage on different workpieces.

A further object of the invention is to provide a gage of this type which can measure the roughness of relatively inaccessable surfaces on a wide variety of workpiece configurations.

A further object of the invention is to provide an instrument of this type which is capable of making surface roughness measurements quickly and with a high degree of accuracy.

An additional object of the invention is to provide a pocket surface gage which is quite rugged and reliable and which has a relatively long useful life expectancy.

Other objects will, in part, be obvious and will, in part, appear hereinafter.

The invention accordingly comprises the features of construction, combination of elements and arrangement of parts which will be exemplified in the following detailed description, and a scope of the invention will be indicated in the claims.

In general, the surface roughness gage to be described in detail hereinafter comprises a rigid staging frame which is arranged to be positioned or staged with its working surface resting on the part to be examined. The frame supports a reciprocating arm terminated by a low profile probe which scans a line of the workpiece surface on which the gage is placed. The arm can be pivoted relative to the frame to four detented angular positions about an axis perpendicular to the nominal plane of the frame working surface. One of the four arm positions is located inside the gage frame thereby providing protection for the probe and probe arm when the instrument is not in use, although measurements can still be taken when the arm is in this stored position through an opening in the bottom wall of the frame. These four positions of the arm and the low probe profile facilitate gaging the surfaces of a wide variety of workpiece configurations and the precisely detented arm positions facilitate staging the gage accurately in relation to the workpieces.

To further increase the instrument's versatility, the bottom or working surface of the frame is formed as an inverted V-shaped groove with a large included angle. This facilitates staging the instrument on curved or cylindrical surfaces without requiring separate fixtures or brackets to support the gage and so that accurate repeatable surface finish data can be taken from those curved surfaces.

The motive source for reciprocating the probe arm is a small, off-the-shelf, battery operated motor with an integral optical encoder whose output signals are directly related to the linear motion of the probe. These encoder signals control the points on the workpiece surface at which data is taken so that small motor speed fluctuations have minimal effect on the repeatability of the data. In other words, data-taking by the gage is not simply time dependent as in some prior probes or dependent upon chart paper movement in an associated recorder, but it is related directly to the surface distance travelled by the probe. The present gage also incorporates a special, very compact limit switch for controlling the reciprocating motion of the probe arm. The switch is arranged so that its actuation does not affect the data being acquired by the gage and does not apply any appreciable off-axis loads to the probe arm drive that might necessitate using a more expensive, higher power drive motor.

The probe mounted to the end of the probe arm comprises a motion transducer and stylus capable of measuring dynamic displacement, as well as a skid which effectively isolates the stylus from low frequency surface variations, such as waviness. It is a feature of this invention that the transducer may be a conventional, low-cost piezoelectric pickup cartridge. The cartridge includes a pair of orthogonal piezoelectric benders, oriented at 45° on opposite sides of an axis perpendicular to the nominal place of the frame working surface (and to the workpiece surface), hereinafter referred to as the Y axis. The stylus, which tracks along the workpiece surface being examined, is coupled to the cartridge by the way of a special yoke. This yoke incorporates a flexure to be described in detail later which gives the stylus only a single degree of freedom in the Y axis direction. Thus, the yoke couples to the two benders in the cartridge only components of the stylus arm displacements parallel to the bender axes. When the stylus is moved along the workpiece, the cartridge generates a pair of electrical signals representing stylus displacements along the bender axes, i.e., oriented at 45° to the Y axis. Since the displacement of interest in surface roughness measurement is Y axis displacement, the signals from the two benders are summed at the output of the cartridge thereby cancelling the horizontal or X components of the signals from the two benders. The summing yields a single signal whose amplitude is proportional to the vertical displacement of the stylus and hence is a criterion of the roughness of the workpiece surface.

As will be seen in detail later, the skid mounted adjacent to the stylus in the probe is relatively adjustable about an axis parallel to the Y axis so that for all positions of the probe arm, i.e. 0°, ±90°, it follows the very same workpiece surface line being traced by the stylus. Accordingly, its filtering characteristic remains the same for all arm positions.

Because the present gage utilizes a piezoelectric transducer to sense surface roughness, the instrument measures only dynamic displacements. A static displacement, i.e., a step function, will produce an initial proportional signal from the transducer which gradually dissipates. As will be described in detail later, this characteristic is used to improve the accuracy of the roughness data acquired by the gage.

With all of the advantages discussed above, the present gage is quite small and compact. Yet, because it incorporates many readily available, off-the-shelf components, it is still relatively inexpensive to make. Indeed its cost is much less than that of prior comparable dynamic surface gaging instruments. Further, as will become apparent, the instrument is quite easy to use and gives the user a quick, clear, visual indication of the surface roughness of the workpiece being examined.

BRIEF DESCRIPTION OF THE DRAWINGS

For a fuller understanding of the nature and objects of the invention, reference should be had to the following detailed description taken in connection with the accompanying drawings, in which:

FIG. 3 is a sectional view on a larger scale taken along line 3—3 of FIG. 2;

FIG. 4 is a similar view taken along line 4—4 of FIG. 3;

FIG. 6 is a longitudinal sectional view showing the gage probe arm in more detail;

FIG. 7 is a bottom view thereof;

DETAILED DESCRIPTION OF THE PREFERRED EMBODIMENT

Figure 1:
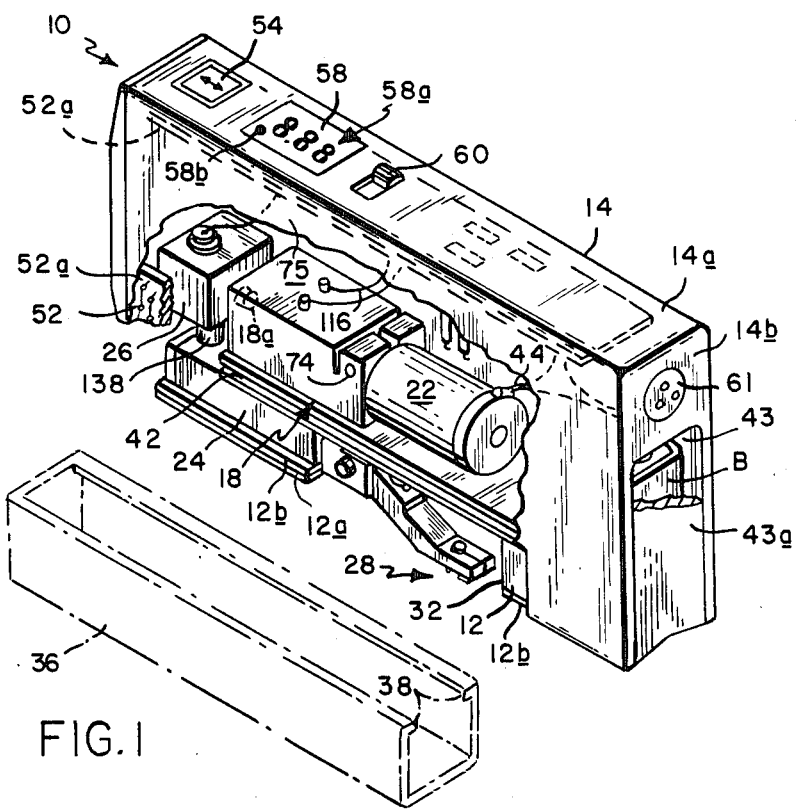
FIG. 1 is an exploded isometric view with parts broken away showing a pocket surface roughness gage incorporating the features of this invention, with the gage probe being shown in its stored position.
Figure 2:
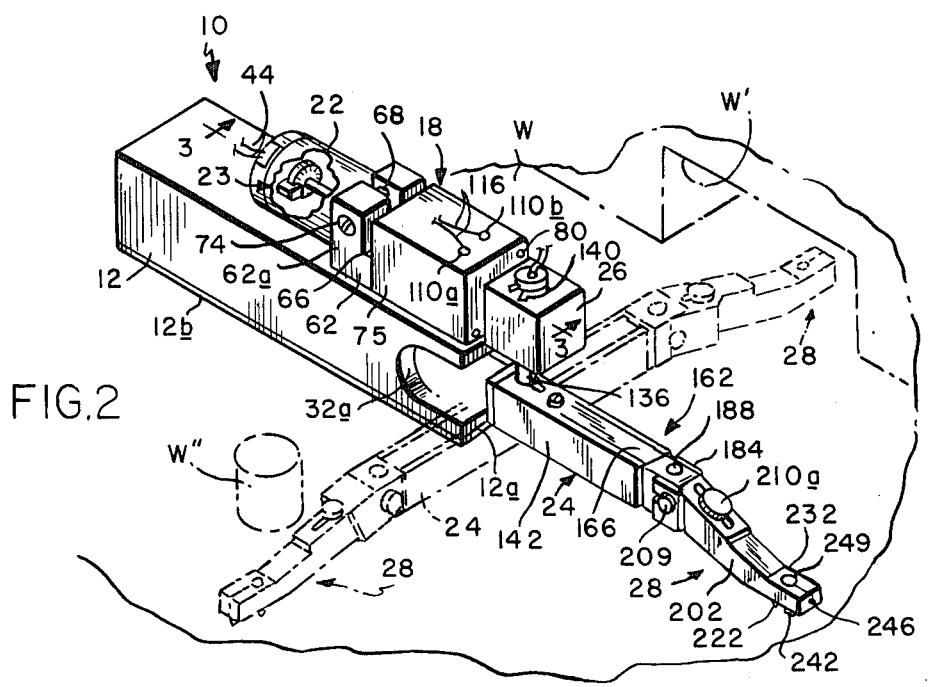
FIG. 2 is an isometric view with parts broken away showing the FIG. 1 gage with its probe in various extended positions.

FIGS. 1 and 2 of the drawings show the pocket surface roughness gage generally at 10. The gage comprises an elongated, narrow, rigid, rectangular staging frame 12 and a housing 14 mounted to the frame which defines therewith an interior space that contains the various electrical and mechanical components of the gage. Mounted to the top of frame 12 inside the housing is a linear actuator 18 which is driven by a small DC electric motor 22 with an integrated optical shaft encoder 23. The shaft 18a of the actuator is connected to one end of an elongated probe arm 24 by way of a pivot block 26. Mounted to the opposite end of arm 24 is a probe shown generally at 28 which tracks along the surface of the workpiece being examined in a manner to be described later.

The probe arm 24 is supported by block 26 so that it lies appreciably below the block at the level of frame 12. Furthermore, arm 24 can be pivoted on the block between four fixed or stable operative positions. These include an axially extended position shown in solid lines in FIG. 2 wherein the arm 24 and probe 28 extend in a straight line in front of frame 12 and a pair of laterally extended positions shown in dot-dash lines in FIG. 2 wherein the arm extends out exactly 90° on opposite sides of the frame. Arm 24 can also be pivoted on block 26 so that it assumes a stored position shown in FIG. 1 wherein the arm 24 and probe 28 are housed in an elongated recess or slot 32 formed in a side wall, herein the left side wall, of frame 12. The slot 32 is open at the front and bottom of the frame and a notch 32a is present in the right hand side wall of the frame at the front thereof to provide clearance so that the arm can be swung to its right lateral extended position illustrated in FIG. 2.

When the arm 24 is in its stored position shown in FIG. 1, slot 32, being open at the bottom of frame 12, exposes probe 28 so when the gage is placed on a workpiece, the surface area of the workpiece below the frame 12 can still be gaged by the instrument. Also when the probe arm is stored, the openings in the sides, front and bottom of frame 12 may be closed by a rectangular cover 36. Longitudinal interior keys or flanges 38 are provided at the opposite upper edges of cover 36 which slide into lengthwise slots 42 in the opposite sides of frame 12 so that the side, bottom and front walls of the cover 36 completely close the openings into frame 12 to protectively enclose the probe and probe arm. Coacting means are provided on the cover and frame, e.g. a boss/dimple (not shown), to releasably retain the cover in its closed position on the frame.

As shown in FIG. 1, the gage housing 14 has a recepticle 43 at its rear end to receive a standard nine volt battery B. The terminals of battery B are connected by electric leads 44 to motor 22 and to other electrical components of the gage to be described later by way of a control circuit 52 on one or more PC boards 52a mounted in the housing 14. The receptacle 43 is closed by a cover 43a slidably engaged to the outer edges of the receptacle.

As seen in FIG. 1, gage 10 includes various other components for operating and reading the gage. More particularly, at the forward end of housing top wall 14a is a push-button MEASURE switch 54. Depression of switch 54 causes the circuit 52 to control motor 22 so as to retract the probe 28 while a surface roughness measurement is taken. Adjacent to switch 54 on wall 14a is a digital display 58 which displays a number 58a representing a surface roughness measurement taken by gage 10. Display 58 also displays a dot 58b when the output voltage of battery B falls below a selected minimum value to apprise the upper the the battery should be replaced. It may also display a number (not shown) representing the roughness average or the maximum peakto-valley height or the average of the five maximum peaks to the five minimum valleys or some other useful surface roughness characteristic. Lastly, adjacent to display 58 is a three position SCALE SELECT slide switch 60 which enables the user to display the roughness measurement in either micro-inches or micrometers or to display one of the other characteristics just mentioned. A connector 61 is mounted in the housing rear wall 14b for connecting a gage to a remote display and/or power source (not shown).

As best seen in FIG. 1, gage 10 is self-contained and compact. When not in use, all of its components are protectively enclosed by housing 14 and cover 36 so that there is litle likihood of the gage components being damaged when the unit is held in the hand or carried about in the user's pocket. To make a surface roughness measurement on a workpiece such as part W in FIG. 2, the user simply removes cover 36 and positions the unit on the workpiece W with arm 24 located in the position best suited to place probe 28 directly over the surface of interest. For example, if the workpiece W has a wide flat expanse as shown in FIG. 2, the probe arm 24 may be placed in its axially extended position shown in solid lines in that figure. On the other hand, if the surface of interest lies inside a small enclosure, such as the one at W′ in FIG. 2 and there is a surface obstruction W″ directly in front of that enclosure, arm 24 may be pivoted to its left lateral extended position as shown in dot-dash lines in FIG. 2, to enable the gage to fit between the enclosure and the obstruction while taking the measurement. Of course, in some cases, as with the workpiece W in FIG. 2, the probe arm need not be extended at all. Rather, the gage can be staged properly simply by positioning its working surface 12a on the part W with the probe arm in its stored position shown in FIG. 1.

As best seen in FIGS. 1 and 2, at the underside of frame 12 there is a working surface 12a defining, by three areas of contact (two on the left side, one on the right side), a plane so that the frame can rest horizontally on a horizontal surface. However, that working surface 12a is grooved along its length so that it has the shape of an inverted letter V. This enables the gage to be staged properly on a rounded or cylindrical workpiece in order to measure the finish of that curved surface. The working surface 12a may constitute the undersurface of frame 12. More particularly, the frame 12, which is usually made of a lightweight material such as aluminum, is notched at its underside and a pair of inserts 12b is attached by appropriate threaded fasteners or by brazing or welding to the frame underside. These inserts are made of tungsten carbide or other such very hard material so that the working surface 12a remains very resistant to wear and abrasion over the useful life of the gage.

Some conventional gages of this type also have V-shaped undersurfaces or use V-shaped staging fixtures for this purpose. However, invariably those surfaces define an included angle of 90° of less. Applicant's gage, on the other hand, has a V-shaped working surface 12a whose opposite walls have a much larger included angle, i.e., in the order of 20°-160°. This provides positive centralization of the gage on a cylindrical workpiece, while still minimizing locational variations on workpieces having different diameters. In other words, with the small included angle of the staging surface of a prior gage, the spacing of the gage arm from the workpiece surface increases as the workpiece diameter increases. Accordingly, the prior gage sometimes indicates different roughness measurements for different diameter workpieces even though those workpieces have the same surface finish. With gage 10, on the other hand, the large included angle defined by the frame undersurface 12a enables the gage to be staged on those different-diameter workpieces at nearly the same elevation with respect to the workpiece surfaces. Therefore the finishes of those pieces as measured by gage 10 will be the same.

Once the gage 10 has been properly positioned on the workpiece as aforesaid, the user simply depresses switch 54. This prompts circuit 52 to energize motor 22 causing actuator 18 to retract shaft 18a along a motion axis (i.e. the Z axis) parallel to the nominal plane of surface 12a a distance in the order of 3/16 inch. Accordingly, probe 28 scans or tracks a like distance along a line on the workpiece surface and develops an electrical signal representative of the surface roughness along that line. That signal is applied to the control circuit 52 which processes the signal and issues an instruction to display 58 that causes the display to show a number 58a indicative of the roughness measurement. This measurement figure is given in either micro-inches or micrometers or the display may show some average characteristic as noted above, depending upon the position of switch 60. When the gage 10 is no longer needed, the arm 24 is returned to its stored position (if not already there) and enclosed by cover 36.

Referring now to FIGS. 2 to 4, motor 22 has a reduced diameter neck portion 22a which projects into the rear end of a tubular bracket 62 having a bore 64. The motor shaft 22b which extends through that bore is provided with an exteriorally threaded sleeve screw 22c anchored to the shaft by a set screw 23. A lateral notch 66 is present adjacent to the front end of bracket 62 which slot extends deep enough to intercept bore 64 thereby separating a bracket upper rear end segment 62a from the remainder of the bracket. Furthermore, a lengthwise slot 68 (FIG. 2) extends down vertically into segment 62a separating that segment into two halves, which together form a C-clamp. Registering lateral holes 72 (one of which is threaded) are formed in segment 62a to accommodate a bolt 74. With the motor neck 22a positioned within the bracket segment 62a, bolt 74 is turned into the threaded hole 72 to firmly clamp the motor 22 to the bracket 62 so that the motor armature 22b is coaxial to the bracket bore 64.

The forward segment 62b of bracket 62 is necked down and received in the rear end of a rigid, rectangular, tubular dielectric plastic block 75 whose bore 76 is enlarged at its rear end segment 76a to receive the bracket segment 62b and to accommodate an electrical switch assembly shown generally at 78. As best seen in FIG. 3, the block 75 and bracket 62 are held together by bolts 79 extending through countersunk lengthwise holes 80 at diagonally opposite corners of block 75 and into registering threaded holes 81 in the bracket. Actuater 18 also includes an elongated nut 86 having a threaded passage 86a into which the thread 22c at the end of the motor armature is threaded. The forward end of nut 86 is coupled to the rear end of actuator shaft 18a. Shaft 18a is tubular having an axial bore 87 and it extends axially through passage 76 of block 75, projecting from the forward end of that block. The diameter of shaft 18a is somewhat less than the inside diameter of block passage 76 creating an annular space between those two members for a cylindrical liner 94. That liner is made of a self-lubricating plastic material such as high density polyethylene and it is press-fit in passage 76 so that it forms a sleeve bearing for shaft 18a. In lieu of liner 94, a linear bearing unit (not shown) may be employed for that purpose.

The coupling between nut 86 and shaft 18a is composed of a somewhat stiff, but flexible, wire cable 95 which extends through block passage 87. The forward end of the cable is secured to a disk 97 seated in an enlarged forward end segment 87a of shaft passage 87. The rear end of the cable extends through an axial hole 96a in a plug 96 and is soldered to the plug. A reduced diameter rear end portion 96b of that plug is press fit into a counterbore 86b at the forward end of nut 86. As best seen in FIG. 3, nut 86 is prevented from rotating by a pin 98 projecting from the top of the nut into a lengthwise slot 99 at the top of bracket forward end segment 62b. Accordingly, when motor shaft 22b rotates, nut 86 along with shaft 18a and the connecting cable 95 are moved axially in block passage 76. The purpose of the flexible cable 95 is to isolate the motion of the probe 28 from extraneous vibrations caused by vibration of the motor and any eccentricity in screw 22c or nut 86 which vibrations could spoil the accuracy of the gage measurement.

As shown in FIGS. 3 and 4, a flat washer 102 made of a conductive metal such as copper encircles the forward end segment 86b of nut 86. The washer is biased against a shoulder 86c at the rear end of that segment by a coil spring 108 compressed between the washer and the forward end of the block passage enlargement 76a. The spring biases the washer 102 rearwardly toward shoulder 86c which functions as a stop means and toward a pair of laterally spaced-apart vertical terminal pins 110a and 110b mounted in block 75. Pins 110a and 110b extend down through vertical holes 111 in the top of block 75 so as to intercept passage segment 76a, with the upper ends of the pins projecting from the top of block 75 as clearly seen in FIG. 4. The lower ends of the pins seat in registering sockets 112 leading from passage segment 76a at the bottom of the block and the pins are held in place by a tight press fit, epoxy resin or other suitable means. When shaft 18a reaches the end of its rearward excursion, the conductive washer 102 engages pins 110a and 110b and completes an electrical connection between them. Thus, the washer-pin set constitutes the contacts of the aforementioned switch assembly 78.

When assembling the gage, before block 26 is attached to shaft 18a, the cable 95 is inserted into the forward end of shaft passage 87 and then disk 97 is seated in shaft passage segment 87a as shown in FIG. 3. Next, the rear end of the cable is pulled tight through plug 96 positioned at the rear end of the shaft and is soldered in place. Then, the projecting rear end of the cable is cut off close to the plug and the plug is press fit into the nut counterbore 86b.

Next, after spring 108 and washer 102 are dropped into the enlarged rear end of block passage 76, the pins 110a and 110b are inserted into their respective holes 111 and sockets 112 and are secured there. Then, the shaft 18a and nut 86 coupled thereto are inserted into block passage 76 from the rear of the block. Finally, the block is secured to bracket 62 by way of bolts 79. Notch 66 at the top of the bracket provides access to the nut set screw 23 in order to couple the sleeve screw 22c to the motor armature 22b after the sleeve screw is turned into the nut 86. Bolt 74 can then be tightened to secure the motor 22 to bracket 62.

Electrical leads 116, attached to the exposed upper ends of the terminal pins 110a and 110b, lead to the control circuit 52 as best seen in FIG. 1. The pair of pins and the contacting washer 102 comprising switch assembly 78 function as a limit switch to control the extent of the forward motion of shaft 18a and probe 28.

During the operation of gage 10, when motor 22 is energized, its shaft 22b rotates, while nut 86 and actuator shaft 18a are prevented from rotating by pin 98 and by other means to be described later. Resultantly, nut 86 and shaft 18a are moved axially relative to block 75 and its liner 94, the direction of such motion depending upon the direction of rotation of the motor shaft. In some cases, it may be desirable to include friction means to inhibit to some extent the sliding of shaft 18a in block 62. Such means are shown generally at 114 in FIG. 3 and comprise a friction plug 115 received in registering vertical passages 116a and 116b in block 62 and liner 94. The plug is urged against the shaft 18a by a spring 117 backed up by a set screw 118 turned into passage 116a. Thus, when the motor shaft rotates in one direction, the nut and shaft are moved forward in the block extension. The forward motion continues until nut shoulder 86c engages washer 102 and pushes it away from pins 110a and 110b. This breaks the electrical connection between those pins, causing circuit 52 to reverse and stop the motor 22 so that the extension of shaft 18a stops. On the other hand, when motor shaft 22a rotates in the opposite direction, nut 86 and shaft 18a are retracted a precise distance into block 62 under the control of circuit 52 when a roughness measurement is being taken by the gage.

It is important to note that the washer 102 and spring 108 are coaxial to the motor shaft 22a and nut 86. Also, the terminal pins 110a and 110b are symmetrically disposed on opposite sides of the shaft and nut. Therefore, the operation of switch assembly 78 does not apply any off-axis loads to the motor shaft. Consequently, a small, low power off-the-shelf DC motor with an integral shaft encoder 23 (FIG. 3) suffices to drive the gage.

Further, the switch assembly 78 provides a nearly instant signal to the gage's control circuit 52 as the washer 102 contacts pins 110a and 110b when the shaft 18a begins to retract. Consequently, the retracting motion of the shaft 18a during measurement is not affected by any axial load on the motor 22 due to spring 108 that might influence the motion of the shaft.

As best seen in FIG. 3, the actuator 18 along with the attached motor 22 is mounted to the top of frame 12. The front and rear ends of the block are anchored to the frame by pairs of threaded fasteners 122 which extend up through holes 124 in frame 12 and are screwed into threaded vertical passages 126 in the underside of the block. Appropriate holes 129 present in the frame undersurface 12a provide screwdriver-access to the fasteners 122 at the forward end of the block.

Figure 5:
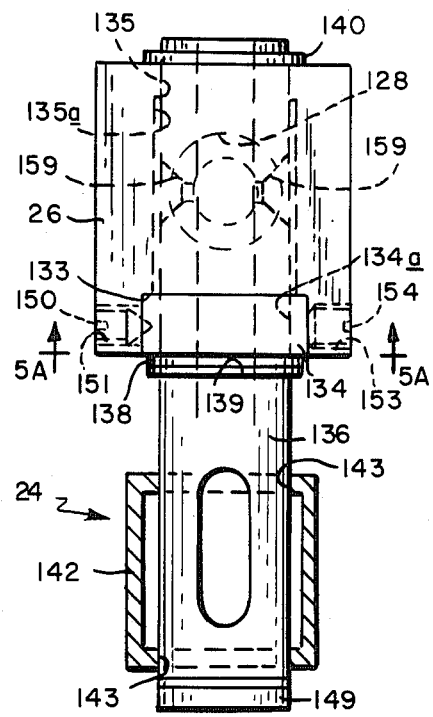
FIG. 5 is a front elevational view on the scale of FIG. 3 showing a portion of the gage in greater detail.

Refering now to FIGS. 2, 3 and 5, as noted previously, pivot block 26 is mounted to the forward end of actuator shaft 18a. A longitudinal recess is present in the rear wall of block 26 to receive the forward end of shaft 18a. The block is retained on the shaft by suitable means such as a set screw 130 received in a threaded passage 131 extending vertically into block 26 and engaging in a circular groove 132 adjacent to the forward end of the shaft.

Block 26 has a longitudinally extending rectangular groove 133 in its underside which snugly receives a rectangular tilt plate 134 whose function will be described later. Also, a vertical passage 135 is formed in block 26 which intercepts the longitudinal passage 128 therein, a registering passage 134a being present in plate 134. Snugly, but rotatably received in passages 135 and 134a is a tubular axle 136 which is retained vertically in block 26 and plate 134 by a cupped spring 138 which engages in a circular groove 139 inscribed in axle 136 just under plate 134 and by a Truarc ring 140 engaged in a similar axle groove just above block 26. Thus, spring 138 pushes plate 134 and block 26 upwards against ring 140 so that there is no vertical play between block 26 and axle 136.

Referring to FIGS. 3, 5 and 6, the rear end of probe arm 24 is attached to the lower end of axle 136. More particularly, arm 124 comprises an elongated rectalinear tube 142. Registering vertical holes 143 are formed in the upper and lower walls of tube 142 near the rear end thereof for snugly receiving the lower end of axle 136. Tube 142 is secured at a right angle to the axle by a threaded fastener 146 which extends through a cap 147 at the rear end of tube 142 and is threaded into a registering hole 148 in the wall of axle 136. Another end cap 149 having a stem 149a is press fit into the lower end of axle 136 to close that end of the axle.

The above-described connections between tube 142, axle 136 and block 26 permit arm 24 to be swiveled about a pivot axis (i.e. the Y-axis) that is perpendicular to the motion axis of actuator shaft 18a (i.e. the Z-axis) in an X-Y plane that is parallel to the nominal plane of frame working surface 12a to the four orthogonal arm positions shown in FIGS. 1 and 2.

Figure 5A:
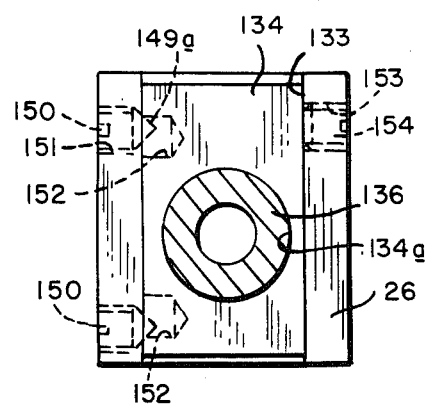
FIG. 5A is a sectional view taken along live 5A—5A of FIG. 5.

To assure that axle 136 is perpendicular to actuator shaft 18a (i.e. is indeed parallel to the Y-axis), means are provided for adjusting the position of block 26 to which shaft 18 is connected with respect to tilt plate 134 which controls the vertical alignment of axle 136. More particularly and referring to FIGS. 3, 5 and 5A, a pair of adjusting screws 150 with tapered ends 150a are threaded into a pair of holes 151 at one, e.g. the right, side of block 26 adjacent to the front and rear edges thereof. The screws and associated holes are positioned near the lower edge of the block so that they are located directly opposite the side edge of tilt plate 134 at locations in front of and behind axle 136. The tapered ends of these screws engage the walls of a pair of holes or recesses 152 in the side of plate 134. These recesses 152 are offset fore and aft the corresponding screws 150 as best seen in FIGS. 3 and 5A. On the opposite side of block 26, directly opposite the rear adjusting screw 150, is a positioning screw 153 which is threaded into a hole 154 in that side of the block. Screw 153 has a flat inner end which engages the adjacent side edge of the tilt plate 134 at that corner of the block, thus establishing the relative position of the plate and block at that location.

With the position of screw 153 end as a reference point for the tilt plate, the other two screws 150 can be turned in one direction or the other so that their tapered ends wedge against the side walls of their respective holes 152 to shift the tilt plate 134 forwardly or rearwardly relative to block 26. As best seen in FIGS. 3 and 5A, the axle-receiving vertical passage 135 in block 26 is counterbored or enlarged at 135a from a point above its interception with block passage 128 down to the bottom of the block. Thus, when adjusting screws 150 are adjusted to move tilt plate 134 longitudinally with respect to the block, the lower segment of the axle which is received in plate 134 is tilted or shifted relative to the upper end of the axle which is snugly retained by the upper end segment of block passage 135. Resultantly, by proper adjustment of screws 150, axle 136 can be oriented so that it is exactly perpendicular to the actuator shaft 18a for all angular positions of probe arm 24, i.e. so that it lies parallel to the Y-axis.

Referring now to FIGS. 2 and 3, it is important that arm 24 should be set precisely at 90° when in its two laterally extended positions because, if it is not, when the gauge is set on a curved workpiece such as a crankshaft, its probe 28 will not produce an output signal that accurately reflects the surface roughness of that workpiece. The reason for this will be described in more detail later. Accordingly, block 26 incorporates a detent arrangement to positively fix the four different angular positions of that arm. In the illustrated gauge 10, the positions are fixed by a spring-loaded ball assembly 158 comprising a ball 158a and a spring 158b. Assembly 158 is contained in an enlargement or counterbore 87a of the actuator shaft recess 87. Ball 158a projects from the forward end of the actuator shaft and is urged by the spring into one of four different dimples or depressions 159 formed exactly 90° apart in the outside wall of axle 136, directly opposite the end of shaft 18a.

Referring now to FIG. 6, probe arm 24 supports probe 28 by way of a planograph indicated generally at 162. More particularly, the upper and lower walls of arm tube 142 have elongated slots 164 which extends to the forward end of that tube. Positioned in the upper slot 164 is an elongated leaf spring 166 having a rear end 166a which underlies the upper wall of tube 142 behind slot 164. The leaf spring end 166a is fastened to that tube wall by a threaded fastener 168 which extends down through a hole 170 in the tube wall into a threaded passage 172 in spring end 166a. Spring 166 extends appreciably beyond the forward end of tube 142 and a series of three lateral notches defining spring flex lines 174a, 174b and 174c are spaced along the length of that spring. Elsewhere, the spring is relatively rigid. The rearwardmost line 174a is located just forward of the rear end of slot 164 in the upper wall of tube 142. The middle line 174b is positioned adjacent to the forward end of slot 164 so that a relatively thick inflexible spring segment 166b extends almost the entire length of slot 164. The third flex line 174c is located appreciably beyond slot 174b thereby defining a thicker spring segment 166c beyond the end of arm tube 142 which is about half as long as segment 166b. Spring 166 also has a forwardmost inflexible segment 166d that extends an appreciable distance beyond notch 174c for reasons that will become apparent later. The spring is bent at flex line 174c so that segment 166d extends downwardly-forwardly at an angle of about 15° with respect to the upper wall of arm tube 142.

A second leaf spring is mounted to the bottom wall of tube 142. Spring 178 has a pair of flex lines 180a and 180b located adjacent to the opposite ends of the slot 164 in the tube lower wall directly below spring flex lines 174a and 174b. These notches define a thick rear segment 178a which is connected by a threaded fastener 182 to the tube lower wall, a thick middle segment that extends almost the entire length of slot 164 and a thick forward segment 178c which extends beyond the forward end of the tube 142 directly below spring segment 166c.

Still referring to FIG. 6, a short tubular member 184 having the same cross-sectional dimensions as tube 142 spaced is slightly in front of tube 142 so that the spring segments 166c and 178c lie just inside the upper and lower walls of that tubular member 184. Spring segment 166c is connected to that upper wall by a threaded fastener 186 which extends through a hole 188 in the upper wall of the tubular member and is threaded into a hole 190 in that spring segment. Similarly, the spring segment 178c is secured to the lower wall of tubular member 184 by a threaded fastener 192 which extends through that lower wall and is threaded into a hole 194 in spring segment 178c. The two flat springs 166 and 178 are thus arranged so that they are quite stiff in the lateral or X-axis direction, but are flexible at their flex lines in the vertical or Y-axis direction. Thus, the flex lines 174a, 174b, 180a and 180b in the two springs function more or less as hinges so that when the tubular member 184 is deflected vertically relative to the arm tube 142, the two springs 166 and 178 comprising planograph 162 limit the motion of tubular member 184 to vertical or Y-axis motion; there are no cocking or rotational movements of the member.

Referring now to FIGS. 6 and 7, the probe 28 of gage 10 is mounted to the tubular member 184 at the end of the arm 24 so that as the probe follows the surface of the workpiece being gaged, it is constrained by the planograph 162 to move vertically relative to the arm. The probe comprises an elongated metal shell or cowl 202 having an inverted U-shaped cross section. The shell has a relatively tall rear section 202a which steps down to form a shorter forward section 202b. The upper wall of the shell inclines downwardly and forwardly, while the lower edges of the shell are substantially horizontal. A pair of side wall tabs or extensions 202c extend rearwardly from shell section 202a. Shell 202 is positioned at the end of probe arm 24 so that the shell segment 202a engages over the forwardly protruding spring segment 166d and so that its rearwardly extending tabs 202c straddle the opposite sides of tubular member 184. A pair of slots 204 extend downwardly-forwardly from the rear edge of shell tabs 202c. These slots receive a headed threaded fastener 206 which extends through passages 208 in the opposite sides of tubular member 184. A knurled nut 209 is threaded onto the protruding end of fastener 206 to clamp the shell tabs 202c to the sides of member 184.

Shell 202, and more particularly its segment 202a, is secured to spring segment 166d by a threaded fastener 210 having an enlarged knurled head 210a. This fastener extends through a lengthwise slot 212 in that upper wall and is threaded into a passage 214 in spring segment 166d. When fastener 210 is tightened, its enlarged head 210a clamps that shell segment to the spring segment. Since the shell is connected to the spring segment and also to the tubular member 184, the spring 166 can be flexed downwardly at its flex line 174c before the nut 209 and fastener 210 are tightened in order to adjust the preload of the forwardmost spring flex line 174c. This affects the stiffness of that flexure in the Y-axis direction and thus the motion of the probe 28 along that axis during operation of the gauge.

Still referring to FIGS. 6 and 7, shell 202 supports a skid assembly shown generally at 218 and a cartridge assembly 220 that includes a stylus 222. The former assembly is captured between a pair of shell extension tabs 202d that project forwardly from the opposite sides of shell segment 202b. This assembly includes a generally rectangular block 224 which is secured by threaded fasteners or cement between tabs 202d. Block 224 has a cylindrical passage 226 that extends vertically from its bottom wall about halfway to the top of that block. Also, a smaller diameter, coaxial, threaded hole 228 extends down from the top of the block to that passage. Threaded into passage 228 is a set screw 232 which itself has an axial passage 234 which is counterbored at 234a. Block 224 supports a generally Z-shaped skid 242 seated at the underside of the block. Skid 242 has a generally cylindrical upper section 242a, a vertical leg 242b which extends down from section 242a at the perimeter thereof and a generally rectangular lower section 242c which extends parallel to the diameter of section 242a that intercepts the upper end of section 242b. Skid section 242a is sized to be received snugly, but slidably and rotatably, in block passage 226 so that it abuts the inner end of set screw 232. Thus, by turning the set screw in one direction or the other, the vertical or Y-axis position of the skid 242 may be adjusted. Once set, the position of screw 232 may be locked by tightening a set screw 246 threaded into a passage 248 at the front of block 224 and engaging screw 232. The skid section 242a is retained in passage 226 by a screw 249 which extends down through the passage 234 in set screw 232 and is threaded into an axial threaded hole 250 in stylus section 242a. Also a coil spring 251 is compressed between the head of screw 249a and the bottom wall of counterbore 234a. Thus, for reasons to be described shortly, skid 242 is rotatable in block 224 at the height set by screw 232 between a forward position at 0° shown in solid lines in FIG. 7 and right and left lateral positions at ±90° as shown in dotted lines in that figure. The resistance to such rotary movement can be adjusted by turning screw 249 in one direction or the other.

Figure 7A:
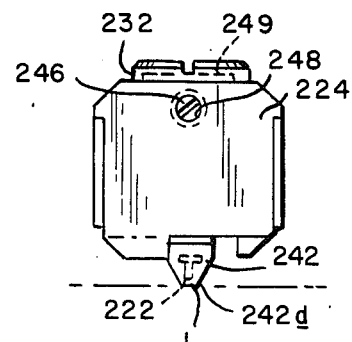
FIG. 7A is an elevational view showing the front of the probe.

As shown in FIGS. 6 and 7A, the lowest stylus section 242c has a rounded undersurface 242d with a radius of about one-half inch, so that it contacts the surface of the workpiece W only along a transverse line L on that undersurface. The proper vertical position of the skid (as set by screw 232) is one which places that line L at the same elevation (i.e., Y-axis direction) as the tip of the stylus 222, as best seen in FIG. 7A.

Figure 8:
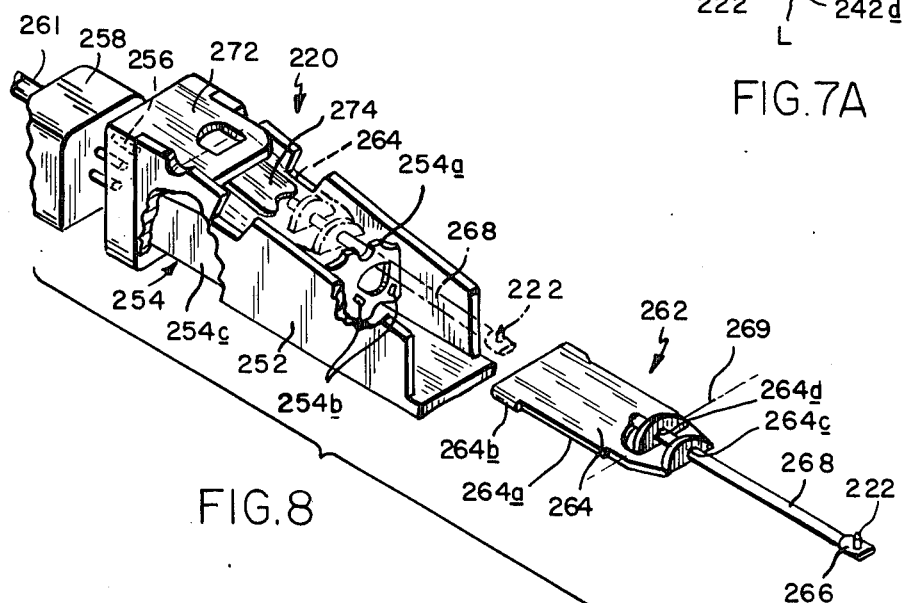
FIG. 8 is an exploded isometric view from below on a much larger scale showing the components of the probe in more detail.

Referring now to FIGS. 6 to 8, cartridge assembly 220 is similar to a standard stereo phonograph cartridge. It includes a shell-like housing 252 which encloses a transducer 254 which includes a yoke 254a connected by a pair of piezoelectric benders 254b to a block 254c fixed to the housing. The benders produce output signals when vibrated, with the amplitudes of these signals being proportional to the excursions of the benders. The two benders in the transducer 254 are orthogonal and oriented at 45° in the X-Y plane.

Normally, a stylus associated with a phonograph cartridge of this type tracks along a V-shaped groove in a phonograph record. One stereo channel is recorded or impressed on one face or wall of that groove and the other channel is recorded on the other wall of that groove. Thus, when the stylus is moved along the record groove, the acoustical information on one wall (consisting of an X-axis component and a Y-axis component) causes one of the benders in the transducer to vibrate while the acoustical data on the other groove wall (also having X and Y components) causes the second transducer bender to vibrate. Resultantly, the two benders produce a pair of electrical signals corresponding to the two channels recorded on the record.

In gage 10, however, which measures surface roughness, only surface irregularities and stylus motion in the Y direction are of interest. Therefore, these two output signals from transducer 254 are summed to cancel their X-axis signal components, thereby yielding a single Y-axis component output signal whose amplitude is indicative of surface roughness. This signal is conducted from transducer 254 to the contacts of a female connecter 256 incorporated into the rear end of cartridge housing 252. Connector 256 is releasably coupled to a male-type plug 258 anchored to the underside of spring segment 166d inside shell 202 by a threaded fastener 259 extending down through the shell and the spring segment into a threaded passage 260 in the top of plug 258. The terminals of that plug are connected to a cable 261 which extends along arm 24 and up through the tubular axle 136 as shown in FIG. 6, exiting the top thereof, whence it is led to the PC board 52a (FIG. 1), there being sufficient slack in that cable 261 to accommodate the reciprocating motion of the probe arm 24.

Instead of the usual audio recording stylus, cartridge 220 is fitted with a special stylus unit indicated generally at 262 which is removably coupled to transducer 254. As best seen in FIGS. 6 and 8, stylus unit 262 includes a metal bracket 264 which is stamped and formed from a single sheet metal blank. It has a generally rectangular elongated main section 264a with a tapered forward end. A pair of tabs 264b extend from opposite side edges of section 264a at the rear end thereof and these tabs are bent and folded over on section 264a to double the thickness of the bracket at its rear end. The forward end of the bracket is bent up and pierced to form an eye 264c and a similar eye 264d is struck from bracket section 264a to the rear of eye 264c. The axes of these eyes are collinear to the longitudinal axes of the bracket as a whole. The stylus 222, which may be a more-or-less standard diamond stylus, is mounted to a tab 266 at the forward end of a long, tubular arm 268. The opposite end of that arm is received in the bracket eyes 264c and 264d, being retained there by suitable means such as a press fit or epoxy cement. As best seen in FIG. 8, the removal of material from the bracket 264 at the location of its eye 264d results in hinge line 269 at that location. Resultantly, the bracket is relatively flexible in the vertical or Y-axis direction along that line, but is still quite stiff in the X-axis direction so that X-axis motion of the stylus 222 and potential movements thereof are not coupled to transducer 254.

Stylus unit 262 is removably positioned in cartridge 220 by sliding the rear end of its bracket 264 between a clip 272 extending from connector 256 and a metal slide 274 mounted to the underside of transducer block 254c near the rear end thereof as shown in FIG. 8. In this position, the stylus arm 268 seats in yoke 254a so that any vibratory motion of the stylus 222 is coupled via the yoke to the piezoelectric benders 254b, thereby producing the surface roughness indicating signal from probe 28.

Typically, the stylus 222 has a tip radius in the order of 0.0004 inch and this radius sets the lower limit of the roughness measurement of gage 10, i.e., the gage resolution. The upper limit of the range is determined by the radius of skid surface 242d which prevents the stylus 222 from responding to longer wavelength workpiece surface variations, such as undulations.

As described previously, skid 242 is rotatable between 0° and ±90° positions so that during gaging, the skid can be positioned on the line traced by the stylus at all positions of arm 24. In this way, the skid will always perform its filtering function along the workpiece surface line actually being traced by the stylus. In other words, when the arm is pivoted to the left toward workpiece recess W' as shown in FIG. 2, the skid is pivoted clockwise to 90° so that it trails the stylus during each retraction stroke of the gage actuator just as it does when the arm and skid are in their solid line positions shown in FIG. 2. Likewise, when the arm is pivoted to the right toward workpiece projection W" shown in that same figure, the skid is rotated 90° counterclockwise so that it still trails the stylus during gaging. Suitable detents or stops (not shown) may be provided in block 224 to positively define the three operative positions of the skid.

Since the probe 28 employs a piezoelectric transducer 254, it is capable of measuring only dynamic Y-axis displacements of stylus 222. Any static displacement of the stylus produces an initial (proportional) signal from transducer 254 which gradually dissipates. By proper selection of the motor 222, i.e., its speed, and of the shaft segment 22c pitch, the traverse speed of the stylus over the workpiece surface may be adjusted so that the breakpoint of the natural high pass filtering of probe 28 coincides with the desired system breakpoint. In other words, surface roughness has a wavelength, but no frequency. Therefore, a stylus traverse speed is selected for the wavelength of interest that falls within the response band of the cartridge 220. In this way, the overall filtering of the gage is enhanced to eliminate unwanted signals from contributing to the roughness measurement. A current version of the gage has a scan speed of 0.33 inch/sec. This provides approximately one more filter pole, thereby increasing the steepness of the low frequency bandwidth skirt. Moreover, this speed is approximately three times faster than that of a conventional gage which scans only 0.125 inch/sec. Thus, an operator using the present gage has three times less chance of moving the gage while taking a measurement and thereby possibly invalidating the results.

Figure 9:
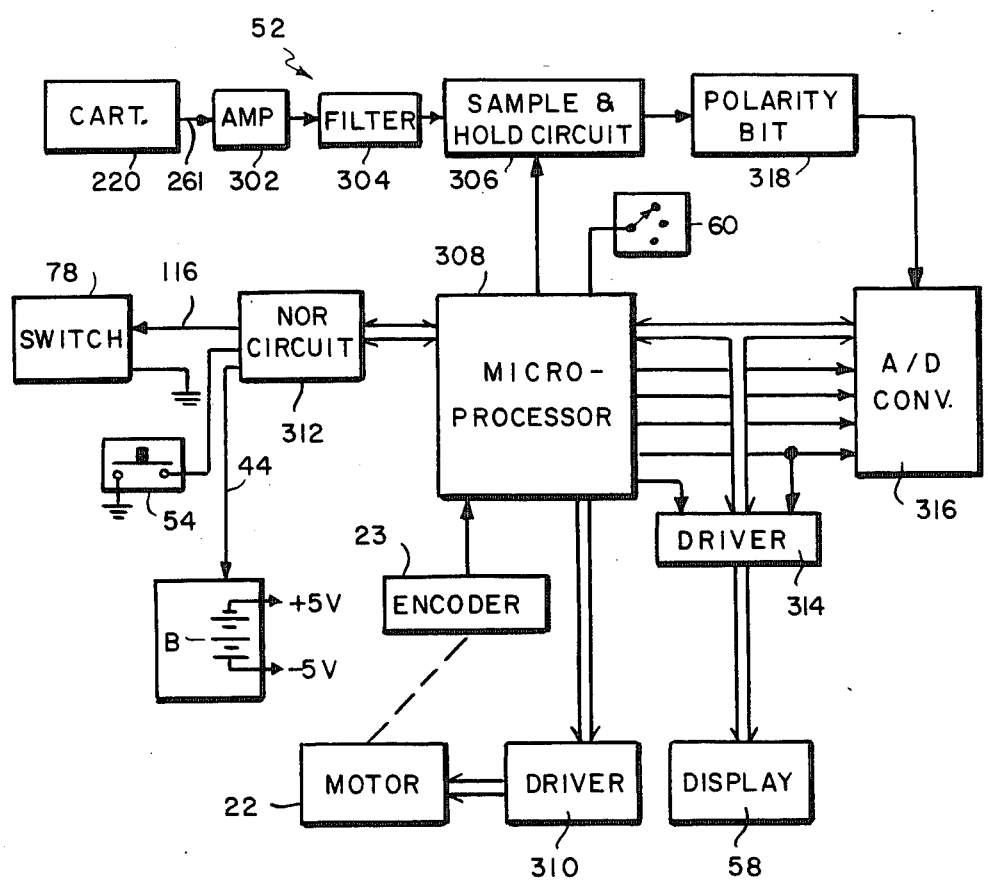
FIG. 9 is a block diagram of the gage's control circuit.

Refer now to FIG. 9 which shows the gages control circuit 52 in greater detail. The output of cartridge 220 present on cable 261 is applied by way of an amplifier 302 and filter 304 to a sample-and-hold circuit 306 which is controlled by a microprocessor 308. The microprocessor responds to the input from selector switch 60 and encoder 23. The microprocessor also controls the driver 310 which drives motor 22. In addition, the microprocessor interrogates the status of switches 54, 78 and the state of battery B by way of nor circuits 312. Still further, the microprocessor controls display 58 by way of its driver 314 and an A/D converter 316 which also receives the output of the sample-and-hold circuit 306 by way of a polarity bit register 318. The presence of the register 318 enables the circuit 52 to use the eight bit A/D converter 316 instead of the next larger and more expensive twelve bit converter and still obtain the desired nine bit resolution in the surface roughness display. This compromise is possible because only the absolute valve of surface roughness is of interest when gaging a workpiece.

When the gage is not in use, its actuator shaft 18a reposes in its fully extended position. Accordingly, switch 78 is open as shown in FIG. 3. In this rest or quiescent condition of the gage 10, no current flows from battery B to the control circuit 52 or to display 58. When a roughness measurement is to be made, cover 36 is removed, allowing probe 28 to project from the bottom of frame 12. Gage 10 is then placed on the workpiece to be examined with the gage arm 24 in one of its four operative positions described above best suited for the measurement. Then the user depresses the MEASURE button 54 momentarily. This connects battery B to the control circuit 52 thereby energizing the electrical components in that circuit depicted in FIG. 9. Processor 308 detects the switch closure and controls driver 310 to drive the motor 22 so as to retract the actuator shaft 18a and probe arm 24.

Immediately upon such motion, retraction of the armature shoulder 86c allows switch 78 to close. That switch is effectively connected in parallel with the switch 54 so that motor 22 continues rotating in the same direction. After a very short delay which allows motor 22 to reach full speed and as the probe stylus 222 is tracking along the workpiece surface, the output from the probe cartridge 220 (which is the electrical analog of the workpiece surface variation in the Y-axis direction) is sampled. This sampling is under the control of the optical encoder 23 and microprocessor 308 so that as the stylus moves a distance in the order of 0.150 inch within the 0.188 (3/16th) inch retraction stroke of the probe, data from more than 3000 data points on the workpiece surface are acquired and stored in the sample-and-hold circuit 306 is less than 160 microseconds per data point.

After the microprocessor 308 has received a selected number of signals from encoder 23, indicating that actuator shaft 18a has moved to its fully retracted position, the microprocessor controls driver 310 to reverse the voltage applied to motor 22 so that the actuator shaft 18a immediately commences an extension stroke. This extension motion continues until the actuator shoulder 86c engages washer 102 and pushes the washer away from terminal pins 110a and 110b, thereby opening switch 78. The opening of this switch causes microprocessor 308 to control driver 310 so that the motor 22 voltage is again reversed and then immediately turned off. Resultantly, actuator shaft 18a and probe arm 24 repose again in their extended positions.

In the meantime, the sample-and-hold circuit 306 in circuit 52 digitizes and averages the sampled surface data acquired during that gage cycle and only after the motor 22 is turned off, applies the average number as an instruction to A/D converter 316 which thereupon controls driver 314 so that display 58 provides a visual indication at 58a (FIG. 1) of that reference number in the units selected by switch 60.

If another measurement is to be taken, the switch 54 must be depressed again to commence another operating cycle of the gage 10. If no more measurements are to be made, arm 24 is placed in its stored position in frame 12 and cover 36 is replaced on the frame. As the cover is slid closed, its lower rear edge engages the declining or sloped underside of probe 28 and lifts the probe upward so that the cover clears the probe stylus 222, with the stylus remaining suspended in the frame slot 32.

In the illustrated gage 10, roughness data is taken only during the retraction stroke of actuator shaft 18a so that initially the probe may be positioned at the very end of a cavity or recess. However, if subsequent extension of the probe is not a problem, the data may be acquired during the shaft extension stroke. Also, by properly programming the processor 308, data taken during a plurality of shaft strokes may be utilized to produce the roughness indication or to cause the gauge to display the other surface roughness characteristics described above.

It will thus be seen that the objects set forth above, among those made apparent from the preceding description are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described.

What is claimed as new and desired to be secured by Letters Patent of the United States is:

1. A pocket surface roughness gage comprising

A. an elongated rigid frame having a working surface for stationary positioning on a workpiece surface;
B. an elongated arm having opposite ends;
C. motive means mounted to the frame and for moving said arm, said motive means including a shaft movable relative to the frame between first and second positions along a motion axis that is parallel to the nominal plane of said working surface;
D. connecting means for connecting one end of the arm to said shaft so that said arm is pivotable relative to the shaft about a pivot axis that is perpendicular to said motion axis;
E. a probe mounted to the other end of the arm, said probe including
  1. a housing,
  2. a skid for engaging the workpiece on which said frame is positioned,
  3. means for attaching the skid to the housing,
  4. stylus means, and
  5. a transducer supporting said stylus means, said transducer producing an electrical signal in response to vibratory motion of said stylus means;
F. control means including a switch connected to said motive means so that when said switch is closed, said motive means moves said shaft between said first and second positions so that the stylus means scans along a surface line of the workpiece on which said frame is positioned; and
G. roughness indicating means mounted to the frame, said indicating means including
  1. display means supported on the frame,
  2. circuit means responsive to signals from said transducer for providing data representing the roughness of the workpiece surface scanned by the stylus means as said shaft moves between said two positions, and
  3. means for applying said data to said display means so that said display means give a visual indication of the roughness of the surface scanned by said stylus means.

2. The gage defined in claim 1 wherein
A. said motive means include a battery-operated DC motor; and
B. said control means also include
  1. means for reversing the polarity of the battery voltage applied to said motor, and
  2. means for actuating said reversing means when said shaft reaches its said first and second positions so that said shaft reciprocates at least once each time said switch is closed.

3. The gage defined in claim 1 wherein said motive means include
A. a linear actuator which incorporates said shaft;
B. a small low-power DC motor mounted to said actuator, said motor having a rotary shaft; and
C. coupling means connecting to said rotary shaft and shaft so that when said rotary shaft rotates, said shaft moves along said motion axis.

4. The gage defined in claim 3 wherein said coupling means comprise
A. threaded means threadedly engaging said rotary shaft;
B. means for preventing rotation of said threaded means; and
C. a universally flexible member connected between said threaded means and said shaft which minimizes the effects of any threaded means eccentricity and vibrations caused by said motor on the motion of said shaft.

5. The gage defined in claim 3 wherein said motor incorporates a shaft encoder which provides signals to said control means indicative of the distance travelled by said shaft from at least one of said first and second positions.

6. The gage defined in claim 1 wherein said frame working surface is defined by one or more inserts at the underside of the frame, said inserts being made of a wear-resistant material and having an inverted V-shaped cross-section, with the walls of the working surface defining an included angle greater than 90°.

7. The gage defined in claim 6 wherein said included angle is in the range of 120° to 160°.

8. The gage defined in claim 1 wherein said stylus means comprise
A. a stylus; and
B. flexure means for mechanically connecting said stylus to said transducer so that only vibratory motion of said stylus in a direction substantially perpendicular to said nominal plane of said working surface is coupled to said transducer.

9. The gage defined in claim 1 wherein said transducer comprises
A. a pair of piezoelectric benders that produce a pair of electrical output signals corresponding to vibratory motions of said stylus means along axes oriented at approximately 45° on each side of an axis that is perpendicular to said motion axis and to said nominal plane of said frame working surface; and
B. means for summing said output signals to produce said transducer signal.

10. The gage defined in claim 1 wherein said arm is flexible, but with only a single degree of freedom in the direction of said pivot axis.

11. The gage defined in claim 1 wherein said arm comprises
A. a first rigid segment at its said one end;
B. a second rigid segment at its said other end; and
C. spaced apart substantially parallel flexure means connected between said arm segments so that relative movement of said arm segments is confined to substantially planographic movement in the direction of said pivot axis.

12. The gage defined in claim 1 wherein said attaching means permit said skid to be rotated about an axis that is substantially parallel to said pivot axis to selected angular positions relative to said stylus means.

13. A pocket surface roughness gage comprising
A. an elongated rigid frame having a working surface for stationary positioning on a workpiece surface;
B. an elongated arm having opposite ends;
C. motive means mounted to the frame and for moving said arm, said motive means including a battery-operated DC motor and a shaft movable by said motor relative to the frame between first and second positions along a motion axis that is parallel to the nominal plane of said working surface;
D. connecting means for connecting one end of the arm to said shaft so that said arm is pivotable relative to the shaft about a pivot axis that is perpendicular to said motion axis;
E. a probe mounted to the other end of the arm, said probe including
  1. a housing,
  2. a skid for engaging the workpiece on which said frame is positioned, 3. means for attaching the skid to the housing,
4. stylus means, and
5. a transducer supporting said stylus means, said transducer producing an electrical signal in response to vibratory motion of said stylus means;

F. control means including a switch connected to said motive means so that when said switch is closed, said motive means moves said shaft between said first and second positions so that the stylus means scans along a surface line of the workpiece on which said frame is positioned, said control means also including means for reversing the polarity of the battery voltage applied to said motor, and actuating means for actuating said reversing means when said shaft reaches its said first and second positions so that said shaft reciprocates at least once each time said switch is closed, said actuating means including switch means comprising a pair of contact means mounted to said motive means on opposite sides of said motion axis; a conductive switch member positioned coaxial to said motor axis opposite said pair of contact means; biasing means mounted to said motive means coaxial to said motion axis for biasing said switch member toward said pair of contact means; and stop means movable with said shaft for engaging said switch member when said shaft reaches one of said first and second positions ; and G. roughness indicating means mounted to the frame, said indicating means including
  1. display means supported on the frame,
  2. circuit means responsive to signals from said transducer for providing data representing the roughness of the workpiece surface scanned by the stylus means as said shaft moves between said two positions, and
  3. means for applying said data to said display means so that said display means give a visual indication of the roughness of the surface scanned by said stylus means.

14. A pocket surface roughness gage comprising
A. an elongated rigid frame having a working surface for stationary positioning on a workpiece surface;
B. an elongated arm having opposite ends;
C. motive means mounted to the frame and for moving said arm, said motive means including a linear actuator having a shaft movable relative to the frame between first and second positions along a motion axis that is parallel to the nominal plane of said working surface, a small low-powered DC motor mounted to said actuator, said motor having a rotary shaft, and coupling means connected to said rotary shaft and said shaft so that when said rotary shaft rotates, said shaft moves along said motion axis, said coupling means comprising threaded means threadedly engaging said rotary shaft, means for preventing rotation of said threaded means, and a flexible member connected between said threaded means and said shaft which minimizes the effects of any threaded means eccentricity and vibrations caused by said motor on the motion of said shaft, said flexible member comprising a cable or wire extending between said threaded means and said shaft ;
D. connecting means for connecting one end of the arm to said shaft so that said arm is pivotable relative to the shaft about a pivot axis that is perpendicular to said motion axis;
E. a probe mounted to the other end of the arm, said probe including
  1. a housing,
  2. a skid for engaging the workpiece on which said frame is positioned,
  3. means for attaching the skid to the housing,
  4. stylus means, and
  5. a transducer supporting said stylus means, said transducer producing an electrical signal in response to vibratory motion of said stylus means;
F. control means including a switch connected to said motive means so that when said switch is closed, said motive means moves said shaft between said first and second positions so that the stylus means scans along a surface line of the workpiece on which said frame is positioned; and
G. roughness indicating means mounted to the frame, said indicating means including
  1. display means supported on the frame,
  2. circuit means responsive to signals from said transducer for providing data representing the roughness of the workpiece surface scanned by the stylus means as said shaft moves between said two positions, and
  3. means for applying said data to said display means so that said display means give a visual indication of the roughness of the surface scanned by said stylus means.

15. A pocket surface roughness gage comprising
A. an elongated rigid frame having a working surface for stationary positioning on a workpiece surface;
B. an elongated arm having opposite ends;
C. motive means mounted to the frame and for moving said arm, said motive means including a shaft movable relative to the frame between first and second positions along a motion axis that is parallel to the nominal plane of said working surface;
D. connecting means for connecting one end of the arm to said shaft so that said arm is pivotable relative to said shaft, said connecting means including pivot means coupled between said shaft and said arm one end to permit said arm to be pivoted about a pivot axis that is perpendicular to said motion axis and to said nominal plane of said working surface so that said arm can be swung through an angle of at least 270°;
E. a probe mounted to the other end of the arm, said probe including
  1. a housing,
  2. a skid for engaging the workpiece on which said frame is positioned,
  3. means for attaching the skid to the housing,
  4. stylus means, and
  5. a transducer supporting said stylus means, said transducer producing an electrical signal in response to vibratory motion of said stylus means;
F. control means including a switch connected to said motive means so that when said switch is closed, said motive means moves said shaft between said first and second positions so that the stylus means scans along a surface line of the workpiece on which said frame is positioned; and
G. roughness indicating means mounted to the frame, said indicating means including
  1. display means supported on the frame,
  2. circuit means responsive to signals from said transducer for providing data representing the roughness of the workpiece surface scanned by the stylus means as said shaft moves between said two positions, and 3. means for applying said data to said display means so that said display means give a visual indication of the roughness of the surface scanned by said stylus means.

16. The gage defined in claim 15 wherein said connecting means also include means for releasably fixing the angular positions of said arm about said pivot axis at angles of 0°, ±90° and 180° with respect to said motion axis.

17. The gage defined in claim 16 wherein
 A. said pivot means include
  1. a block mounted to said shaft, and
  2. a post aligned with said pivot axis and having one end connected to said one end of said arm and its opposite end rotatively received in said block; and
 B. said fixing means include
  1. first detent means mounted to said shaft inside said block, and
  2. second detent means located on a segment of said post inside said block at each of said angular positions.

18. The gage defined in claim 17 wherein said connecting means also include means for adjusting the orientation of said post with respect to said shaft so that said pivot axis is perpendicular to said motion axis.

19. The gage defined in claim 18 wherein said adjusting means include
 A. a plate member rotatively received on said post and interfitting with said block
 B. means for adjusting the relative position of said plate member and said block in the motion axis direction.

20. The gage defined in claim 19 wherein said adjusting means include
 A. a first screw hole in said block;
 B. a second screw hole in said plate member in partial alignment with said first hole, but being displaced in the motion axis direction; and
 C. a screw having a tapered end and threadedly received in one of said holes with said tapered end engaging the wall of the other of said holes.

21. The gage defined in claim 16
 A. further including means defining a storage space in a side of said frame, said space having an opening to said frame working surface; and
 B. wherein said pivot means support said arm one end so that when the arm is swung to said 180° position, the probe and probe arm are located in said frame storage space with said probe being exposed in said opening to said working surface.

22. The gage defined in claim 21 and further including cover means releasably coupled to said frame for covering said space and said opening.

23. A pocket surface roughness gage comprising

A. an elongated rigid frame having a working surface for stationary positioning on a workpiece surface;
B. an elongated arm having opposite ends;
C. motive means mounted to the frame and for moving said arm, said motive means including a shaft movable relative to the frame between first and second positions along a motion axis that is parallel to the nominal plane of said working surface;
D. connecting means including pivot means for converting one end of the arm to said shaft so that said arm is pivotable about a pivot axis that is perpendicular to said motion axis and to said nominal plane of said working surface so that the arm can be swung through an angle of at least 270°, said pivot means including a block mounted to said shaft and a post aligned with said pivot axis and having one end connected to said one end of said arm and its opposite end rotatively received in said block, said connecting means also including fixing means for releasably fixing the angular positions of said arm about said pivot axis at angles of 0°, +90° and 180° with respect to said motion axis, said fixing means including first detent means mounted to said shaft inside said block and second detent means located on a segment of said post inside said block at each of said angular potitions;
E. a probe mounted to the other end of the arm, said probe including
 1. a housing,
 2. a skid for engaging the workpiece on which said frame is positioned,
 3. means for attaching the skid to the housing, said attaching means permitting said skid to be rotated about an axis that is substantially parallel to said pivot axis to selected angular positions relative to stylus means ;
 4. stylus means, and
 5. a transducer supporting said stylus means, said transducer producing an electrical signal in response to vibratory motion of said stylus means;
F. control means including a switch connected to said motive means so that when said switch is closed, said motive means moves said shaft between said first and second positions so that the stylus means scans along a surface line of the workpiece on which said frame is positioned; and
G. roughness indicating means mounted to the frame, said indicating means including
 1. display means supported on the frame,
 2. circuit means responsive to signals from said transducer for providing data representing the roughness of the workpiece surface scanned by the stylus means as said shaft moves between said two positions, and
 3. means for applying said data to said display means so that said display means give a visual indication of the roughness of the surface scanned by said stylus means.

* * * * *